US 6,556,178 B1

(12) United States Patent
Johnson

(10) Patent No.: US 6,556,178 B1
(45) Date of Patent: *Apr. 29, 2003

(54) IMAGE PROJECTION SYSTEM

(76) Inventor: Scott R. Johnson, Zasingstrasse 4, 81547 Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/413,163

(22) Filed: Oct. 6, 1999

(30) Foreign Application Priority Data

Oct. 7, 1998 (EP) .............................. 98118902

(51) Int. Cl.$^7$ ................................. G09G 3/34
(52) U.S. Cl. ................ 345/84; 348/771; 359/443; 345/4
(58) Field of Search .............. 345/87, 55, 6, 345/84, 108, 85, 175; 359/122, 326, 443; 348/40; 273/129 R

(56) References Cited

U.S. PATENT DOCUMENTS 4,798,465 A * 1/1989 Knollenberg ............... 356/336
4,881,068 A    11/1989 Korevaar et al.
5,072,215 A * 12/1991 Brotz ......................... 340/795
5,684,621 A * 11/1997 Downing .................... 359/326
5,924,013 A *  7/1999 Guido et al. ................ 455/3.1

FOREIGN PATENT DOCUMENTS

| JP | 2293890 | | 5/1990 | | |
|---|---|---|---|---|---|
| JP | 2204775 | | 8/1990 | | |
| JP | 3075791 | | 3/1991 | | |
| JP | 5027695 | | 2/1993 | | |
| JP | 05027695 | * | 5/1993 | .......... | G03B/21/60 |
| WO | WO9203890 | | 3/1992 | | |
| WO | WO 92/03890 | * | 5/1992 | .......... | H04N/15/00 |

* cited by examiner

Primary Examiner—Bipin Shalwala
Assistant Examiner—Mansour M. Said

(57) ABSTRACT

A projection system is provided having an aerosol generator for producing aerosol in a defined space. At least two light beam generators are arranged to direct light beams from at least two different positions onto the aerosol. Projection controls are adapted to convert three-dimensional image data into projection signals which are supplied to the light beam generators to project the three-dimensional image to become visible in the aerosol space.

25 Claims, 3 Drawing Sheets

IMAGE PROJECTION SYSTEM

The present invention relates to a projection system adapted to project 3-dimensional images onto an aerosol generated in a defined space. More particularly, the invention relates to a projection system by which image data stored in a computer memory can be projected onto an aerosol space from different perspectives. In addition, the invention relates to the projection of moving images.

Various projection techniques are known in the art by which 3-dimensional images can be projected into space, for example projected into a localised area of a room for demonstration purposes. Holographic projections are well known, where waves of intersecting light beams cancel or add to produce the desired display. Despite the possibilities holographics offer, such systems have not found wide application principally due to the high costs of such systems.

Many applications exist in which 3-dimensional projections, especially animations, would be desirable. Examples include presentations in advertising, entertainment, product development in industry and in medicine. Also in basic scientific research, it would be useful to display "life-size" projections of events which take place on the microscopic level.

An object of the present invention is to provide an improved projection system which allows simple and inexpensive projection of 3-dimensional images.

According to the present invention a projection system is provided as defined in claim 1. Aerosol generation means are provided for producing a liquid and/or solid particle suspension in a gas, such as in the air space of a normal room. The term particle as used herein refers to the constituient components of the aerosol, which may be liquid droplets, solid crystals, aggregates, clusters, etc. The preferred aerosol is a liquid droplet suspension in air, however the invention is not limited to this embodiment. The produced aerosol has the property of being invisible or colourless to the human eye when not being illuminated, i.e. under normal lighting conditions. For this purpose, the size, distribution and/or composition of the aerosol particles, or a combination of these properties, is suitably selected.

Light beam generators are provided in an arrangement to direct light beams from at least two different positions onto the aerosol in the defined space. Preferably four light beam generators are provided to illuminate the aerosol space, which are preferably digital video projectors.

The system is operated under projection control means, which will normally comprise hardware and software components integrated into a computer system. 3-dimensional image data of the image to be projected is obtained beforehand and preferably stored in a computer memory. The image data is converted by the software into projection signals, which are supplied to the light beam generators. In this manner, a 3-dimensional image or animation obtained from external sources can be displayed in the defined aerosol space.

The projection system with the non-visible projection medium has the advantage of not causing disruption or distraction in a conference room. An image or animation can then be displayed and removed as desired without substantially interrupting the normal working conditions. Preparations for projection are no longer necessary, for example dimming the lights or rearranging the seating.

In addition, a surprise effect can be acheived especially in the entertainment and advertising fields. The suddenly projected image gives the impression of appearing as if from "thin air". The resulting reactions are wonderment and heightened attention.

Further objects and advantages of the present invention will become apparent from the following description of embodiments taken in conjunction with the figures.

Figure 1:
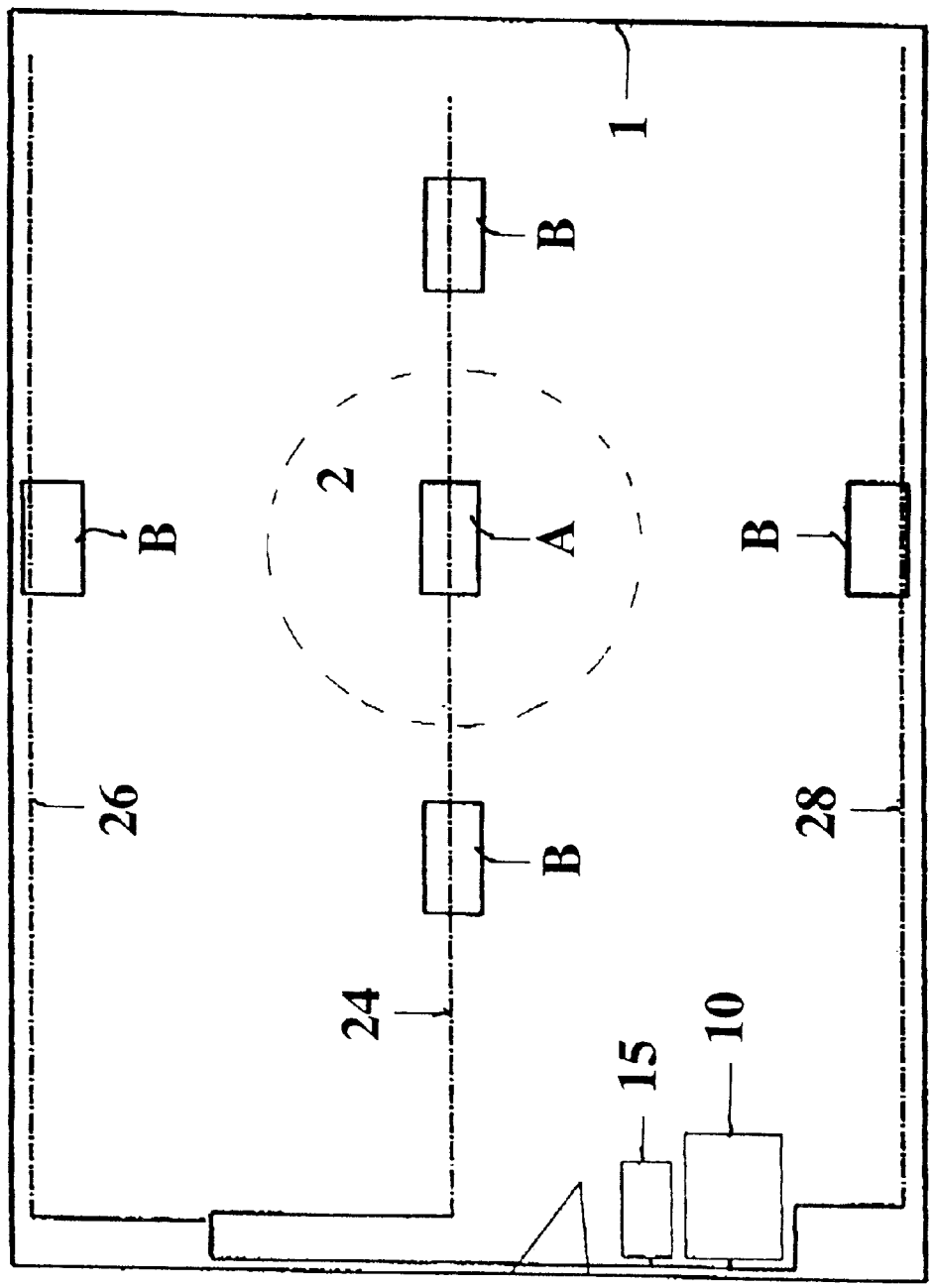
FIG. 1 shows a schematic illustration of an embodiment in which the system will typically be set up in an inside room.

Referring to FIG. 1, an embodiment is shown in which the system would be set up in a room, such as a conference room or an entertainment room. It should be noted however, that the present invention is not restricted to a closed room, but may just as well be realised in an open or outdoor setting. FIG. 1 illustrates the floor plan of a room 1. A first carriage A is movably mounted on first guidance 24. The carriage will normally be arranged near the ceiling of the room and is provided with aerosol generation means (to be discussed below). An aerosol is produce in a defined space 2 within the room, as indicated schematically with the dashed lines in FIG. 1.

Second guide means 26, 28 are also provided in this embodiment on either side of the room 1. At least two second carriages B are movably mounted on the second guide means 26, 28. In the embodiment of FIG. 1, four second carriages B are provided, where two of the second carriages B are mounted on the first guide means 24. The second carriages are each provided with a light beam generator arranged so as to direct a light beam onto the space 2.

Figure 2:
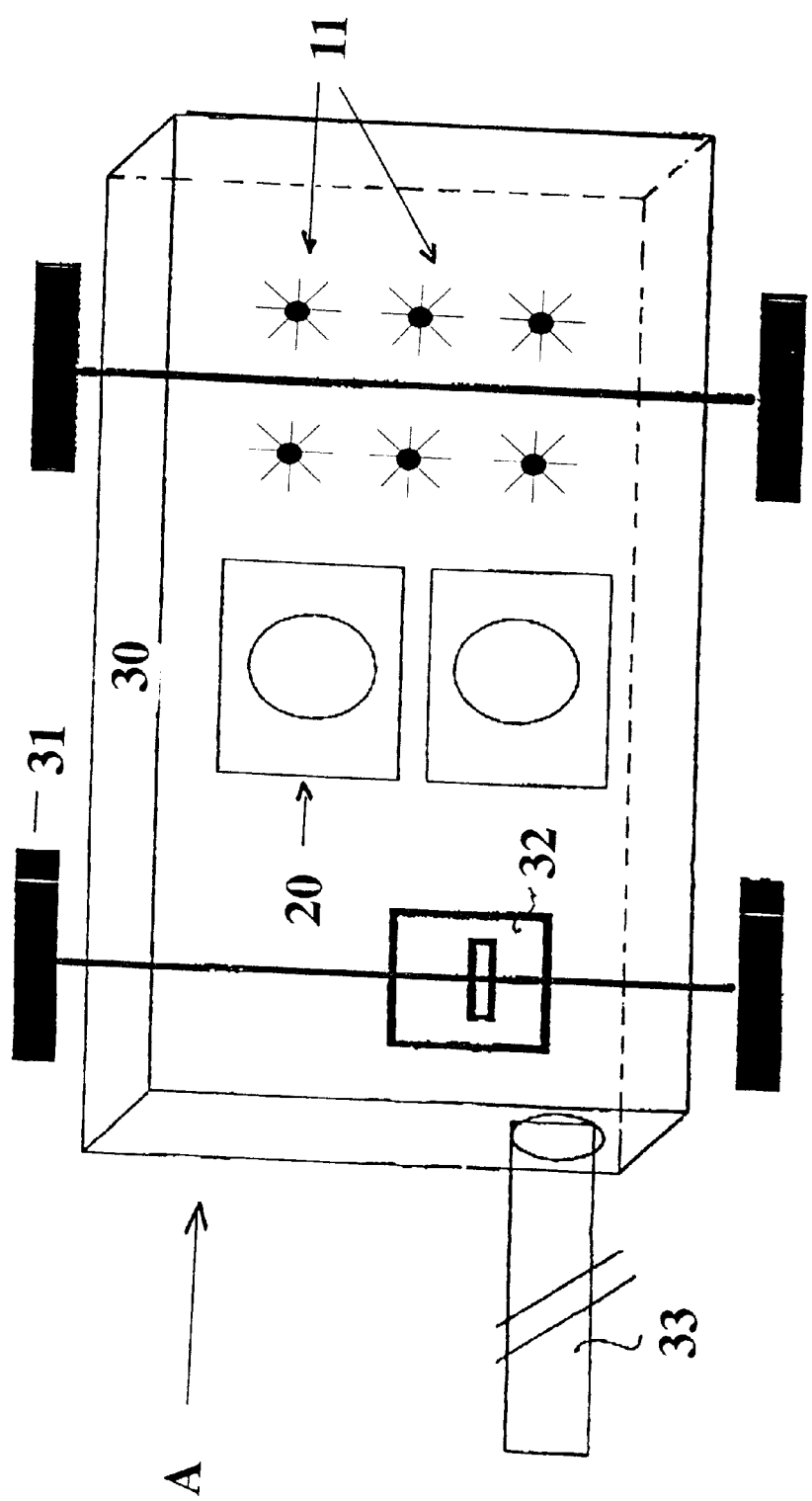
FIG. 2 shows an arrangement of a first carriage employed to generate the aerosol.

FIG. 2 illustrates an example of the first carriage A comprising a body 30 mounted on wheels 31, which are driven by a motor and gear assembly 32. In this embodiment, the guide means 24 comprise a track along which carriage A can be driven under control of signals supplied from a computer via the cable 33. The carriage A is fitted with aerosol producing nozzles or heads 11 adapted to emit liquid and/or solid particles to the space below the carriage A.

As mentioned above, the aerosol may comprise liquid droplets (particles) alone or in combination with solids, such as crystals. Important is the selection of the characteristic properties of the particles, such that the aerosol is not substantially visible. Various devices for creating aerosols are known in the art. The particle size and distribution can be determined by the nozzle construction and the spacing of the nozzles as well as the particle production rate.

The aerosol generation means of the present invention are preferably adapted to produce liquid and/or solid particles having an average diameter in the range of 0.1 to 50 $\mu$m. Highy acceptable projections are achieved with particle sizes in the range of 0.1 to 30 $\mu$m, preferably in the range of 1 to 10 $\mu$m. The very small particles are normally not visible of themselves. The larger particle aerosols can be made invisible (colourless) by reducing their density or by employing additives to alter the refractive index of the particles.

Means may also be provided for electrostatically charging the particles, for example as they leave the nozzles. In this embodiment, the particle distribution can be adjusted by adjusting the amount of charge on the particles. In addition, when larger, heavier particles. are present, they can be held in suspension (kept from falling) by the provision of means for applying an electric field.

A preferred embodiment employs a so-called water breaker as the aerosol generator. Such devices are commercially available for example from Jim Water Cracker, Inc., U.S.A. In this embodiment, water droplets are preferably produced with an average diameter of 0.1 to 30 μm. The colourless property can be acheived by reducing the particle density and/or adding supplements to change the refractive index of the water.

Referring back to FIG. 1, a water breaker 10 as part of the aerosol generation means is provided which can be placed at the side of the room. The water breaker or vapour generator produces aerosolised air which is supplied in supply lines through the cable means 33 to the nozzles 11. The size and distribution of water droplets are controlled by projection control means 15. The produced vapour is normally also odourless and not capable of being physically sensed by a persons present in the room. The vapour is also such that under normal temperature and humidity conditions in the room, it will not condense on objects in the room. The supply of vapour is continuous, whereby a stable and uniform vapour space is created.

The projection control means 15 of the present system comprise software means for producing control signals to set the aerosol characteristics and dimensions of the desired space. The control signals are generated on the basis of input data relating to the type of image to be projected, type of aerosol used, size of the room, natural lighting of the room, special effects to be achieved, etc. The control signals are supplied to be aerosol generation means to thereby generate the desired aerosol space.

Figure 3:
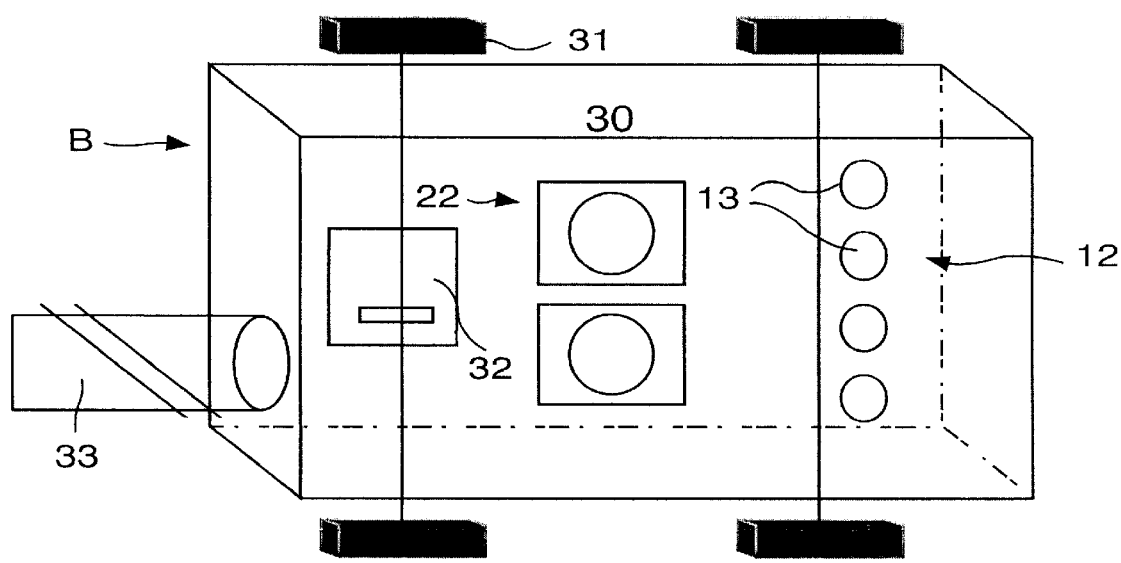
FIG. 3 shows an arrangement of a second carriage on which a light beam generator is disposed.

FIG. 3 illustrates an example of the second carriage B, which also comprises a body 30 mounted on wheels 31 which are driven by a motor/gear assembly. The carriages B may be mounted on the separate guide means 26, 28 as shown in FIG. 1 or may be mounted on the same guide means 24 as the carriage A. The carriages B carry light beam generators 12, which consist of a least 3 colour light sources. In the embodiment of FIG. 3, four light sources are illustrated, which, for example, could be red, green, yellow and blue.

Preferably, the light beam generators are so-called digital video beamers, which are commercially available, for example from EIKI GmbH, Germany. Digital video input data is converted and projected in 2-d at various resolutions and power ratings. For the present invention, a power rating of at least 600 Joules is required, preferably 900 Joules. 15 meter×15 meter projections are possible with 762×1024 pixels.

Referring back to FIG. 1, the carriages B are variably disposed about the defined aerosol space such that the light generators can project light beams onto the space at variously adjustable positions and distances. In the embodiment of FIG. 1, the two carriages mounted on the guide means 24 would be at an elevation of the carriage A, i.e. near the ceiling. The two side carriages B mounted on the guide means 26, 28 could be positioned for example at about shoulder height of a person standing in the room. The invention however is not restricted to any elevation or angular disposition the carriages B with their light beam generators.

Positional control means are provided on the first and second carriages A, B to define the position the aerosol space 2 is to take up within the room and to adjust the position of the light beam generators relative thereto. The position within the room can be set with lasers, ultra-sonic devices or other guidance means know in the art. The present embodiment employs lasers, however, the invention is not limited thereto. The first carriage A (FIG. 2) comprises two laser transmitters 20, which are directed into the space of the room. One or more positions within the room can be defined by the laser beams emitted from the transmitters 20. Target points are defined for example by intersection of the two laser beams or by a defined distance along one or both of the laser beams.

Laser receivers 22 are disposed on the second carriages B (FIG. 2). The receivers are adapted to detect the points defined by the laser transmitters 20. Based on this information, the actual position of the light beam generator 12 with respect to given points in the aerosol can be determined. Moreover, the projection control means 15 of the system generates control signals to be supplied to the laser positions with respect to the projection positions defined within the aerosol space.

The projection control means 15 (illustrated schematically in FIG. 1) comprise the necessary hardware and software for controlling the projection operation. For example, 3-dimensional image data is commonly produced and stored in a computer memory in CAD systems. Such data can represent the digital data base for the present invention. The projection control means 15 comprise software which enables the operator to select an arbitrary perspective view of the 3-dimensional object, for example from a computer screen. The stored digital data of the object as seen from this perspective can then be extracted from memory and converted into projection signals to be supplied to a corresponding light beam generator 12 for projection onto the aerosol.

According to the invention, means are provided to select at least two arbitrary perspective views and to supply the corresponding image data to the at least two light beam generators 12. The projection control means 15 will at the same time provide control signals to the positional control means to adjust the relative position of the second carriages B in correspondence with the particular perspective view selected.

The present projection system is not restricted to the presence of CAD image data. 3-D scanners or other imaging techniques known in the art can also provide the image data. Animations or moving images from various sources may be taken as the image data for projection. For example, digital data from TV cameras at various perspectives of an object or a scene can be used as the image data for aerosol space projection.

As mentioned above, the system is not restricted to use in a closed room. The system is mobile and can be readily assembled in outdoor environments for example at outdoor conventions, sports events, trade fairs or music concerts.

What is claimed is:

1. A projection system comprising:

means for generating an aerosol of particles that are distributed uniformly in a defined three-dimensional space;

a plurality of spaced-apart digital video beamers arranged to direct light beams to illuminate the defined space; and projection control means for converting three-dimensional image data into projection signals to be supplied to the digital video beamers, whereby the digital video beamers project the three-dimensional image so as to become visible in the defined space.

2. The system of claim 1, wherein the generating means produces liquid or solid particles having an average diameter in the range of 0.01 to 50 microns.

3. The system of claim 2, wherein the generating means produces liquid or solid particles having an average diameter in the range of 1 to 10 microns.

4. The system of claim 1, wherein the generating means produces water droplets as the aerosol particles having an average diameter in the range of 0.1 to 30 microns.

5. The system of claim 1, wherein the projection control means includes means for producing control signals for setting the characteristics of the aerosol and the dimensions of the desired aerosol space, the control signals being provided to the generating means.

6. The system of claim 1, further including a first guide, and a first carriage movably mounted to the first guide, the first carriage having an aerosol head for generating particles to form the defined space in a region below the first carriage.

7. The system of claim 6, further including a second guide, and a plurality of second carriages movably mounted to the second guide, with each second carriage having one of the digital video beamers disposed thereon for directing a light beam at the aerosol particles.

8. The system of claim 1, further including laser positional controls for controlling the positions of the digital video beamers and the direction of the light beam emission with respect to the defined space.

9. The system of claim 8, wherein the laser positional controls include:

laser transmitters disposed on the first carriage and being controlled to define projection positions within the defined space; and laser receivers disposed on the second carriages and being controlled to detect the projection positions and to control the relative positions of the second carriages with respect to the projection positions.

10. The system of claim 8, wherein the projection control means include means for producing control signals to be supplied to the laser positional controls to define the projection positions within the defined space and to define the relative positions of the second cartridges with respect to the projection positions.

11. The system of claim 1, wherein the projection control means includes:

means for selecting an arbitrary perspective view of the three-dimensional object to be projected; and means for extracting image data for the perspective view;

wherein image data from at least two different perspectives is supplied respectively to each of at least two digital video beamers.

12. The system of claim 11, wherein each of the digital video beamers comprises at least three light sources of different color.

13. The system of claim 1, wherein the three-dimensional image to be projected is a moving image.

14. The system of claim 1, wherein the particles are substantially not visible in the non-illuminated state.

15. A projection system, comprising:

means for generating an aerosol of particles that are distributed uniformly in a defined three-dimensional space;

projection control means for generating digital projection signals from at least two perspectives of a three-dimensional object to be projected, the projection signals representing two-dimensional video signals from each perspective;

light beam projection means for converting the projection signals into light beams representing views from the at least two perspectives, the light beam projection means having at least one digital video beamer that directs the light beams to illuminate the aerosol from at least two different positions, whereby the three-dimensional object becomes visible in the aerosol space.

16. The system of claim 15, wherein the generating means produces liquid or solid particles having an average diameter in the range of 0.01 to 50 microns such that the particles are not visible in the non-illuminated state.

17. The system of claim 15, wherein the light beam projection means comprise at least two digital video beamers arranged at variable positions about the aerosol space.

18. The system of claim 15, wherein the light beam projection means comprise a digital video beamer connected to serially receive the projection signals representing the different perspectives and light beam transmission means arranged about the aerosol space to serially detect light beams from the video beamer onto the aerosol from at least two different positions.

19. A method of projecting a three-dimensional image onto an aerosol of particles, comprising:

generating an aerosol of particles that are distributed uniformly in a defined three-dimensional space;

converting image data of an object to be projected from at least two positions into projection signals;

transmitting the projection signals from the at least two positions to at least two digital video beamers; and directing light beams from the at least two digital video beamers to illuminate the pace so as to project the three-dimensional image to be visible in the space.

20. A projection system, comprising:

means for generating an aerosol of particles that are distributed uniformly in a defined three-dimensional space, the aerosol particles being substantially invisible to the human eye when the aerosol particles are not illuminated, a plurality of digital video beamers arranged to direct light beams to illuminate the defined three-dimensional space from at least two different positions, and projection control means adapted to convert three-dimensional image data into projection signals to be supplied to the digital video beamers, whereby the digital video beamers project the three-dimensional image so as to become visible in the defined space.

21. The projection system of claim 20, wherein the generating means produce water droplets as the aerosol particles having an average diameter in the range of 0.1 to 30 μm.

22. The projection system of claim 20, wherein the projection control means comprise means for producing control signals for setting characteristics of the aerosol and the dimensions of the desired three-dimensional aerosol space, said control signals being supplied to said generating means.

23. The projection system of claim 20, further including laser positional controls for defining the positions of the digital video beamers and the direction of light beam emission therefrom with respect to said three-dimensional aerosol space.

24. The projection system of claim 20, wherein the projection control means comprise means for selecting an arbitrary perspective view of the three-dimensional object to be projected and means for extracting image data for the perspective view, wherein image data from at least two different perspectives is supplied respectively to each of said at least two digital video beamers.

25. The projection system of claim 20, wherein the three-dimensional image to be projected is a moving image.

* * * * *